(12) United States Patent
Yokoi et al.

(10) Patent No.: US 8,472,701 B2
(45) Date of Patent: Jun. 25, 2013

(54) POSITION MEASURING APPARATUS

(75) Inventors: Hironori Yokoi, Kawasaki (JP); Toshio Endoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 12/585,113

(22) Filed: Sep. 3, 2009

(65) Prior Publication Data
US 2010/0061623 A1   Mar. 11, 2010

(30) Foreign Application Priority Data
Sep. 5, 2008   (JP) .................................. 2008-228192

(51) Int. Cl.
*G06K 9/00* (2006.01)
*G06K 9/46* (2006.01)

(52) U.S. Cl.
USPC .......................................... 382/154; 382/201

(58) Field of Classification Search
USPC .... 382/54, 201; 348/78, 108; 483/52; 901/19
See application file for complete search history.

(56) References Cited

U.S. PATENT DOCUMENTS

| | | | |
|---|---|---|---|
| 6,751,344 B1 * | 6/2004 | Grumbine | 382/154 |
| 7,945,431 B1 * | 5/2011 | Mukherjee et al. | 703/2 |
| 2003/0174880 A1 | 9/2003 | Sakamoto | |
| 2007/0124949 A1 * | 6/2007 | Burns et al. | 33/288 |
| 2007/0147811 A1 | 6/2007 | Nakao et al. | |
| 2008/0075328 A1 * | 3/2008 | Sciammarella | 382/108 |

FOREIGN PATENT DOCUMENTS

| | | |
|---|---|---|
| JP | 2004-328657 | 11/2004 |
| JP | 2007-174566 | 7/2007 |

OTHER PUBLICATIONS

European Search Report dated Feb. 15, 2011 issued in corresponding European Patent Application 09169347.3.

* cited by examiner

*Primary Examiner* — Amara Abdi
(74) *Attorney, Agent, or Firm* — Staas & Halsey LLP

(57) ABSTRACT

A position measuring apparatus including a first irradiating part that irradiates a first beam to an object, a second irradiating part that irradiates a second beam to the object, a capturing part that captures images of the object, a processing part that generates a first difference image and a second difference image by processing the images captured by the capturing part, an extracting part that extracts a contour and a feature point of the object from the first difference image, a calculating part that calculates three-dimensional coordinates of a reflection point located on the object based on the second difference image, and a determining part that determines a position of the object by matching the contour, the feature point, and the three-dimensional coordinates with respect to predetermined modeled data of the object.

13 Claims, 11 Drawing Sheets

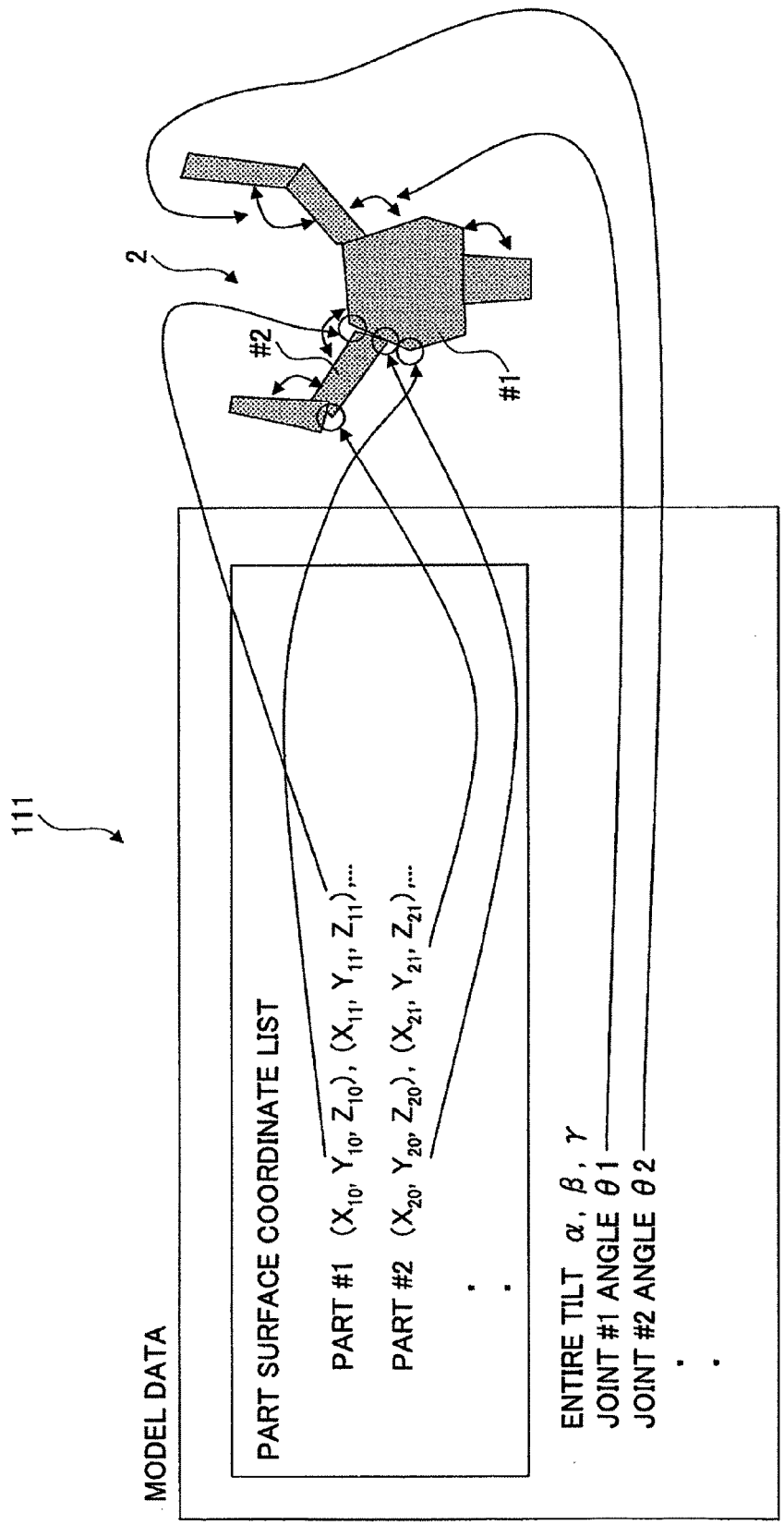

POSITION MEASURING APPARATUS

CROSS-REFERENCE TO RELATED APPLICATIONS

This application is based upon and claims the benefit of priority of the prior Japanese Patent Application No. 2008-228192 filed on Sep. 5, 2008, the entire contents of which are incorporated herein by reference.

FIELD

The embodiments discussed herein are related to a technology for measuring a position of an object having multiple joints such as a hand or an arm of a human or an arm of a robot.

BACKGROUND

As for technology for automatically measuring a shape or a position of an object, various methods based on a three-dimensional shape measuring method are known.

As one method, there is a light sectioning method of capturing an image of a target object with a camera while irradiating and moving a linear laser beam with use of a galvanomirror and measuring a detailed three-dimensional shape of the target object based on linear reflection position (curve) of the captured image. The advantage of this method is that the shape of the object can be measured with extremely high precision.

As a second method, there is a method of capturing an image of a target object with a camera by uniformly irradiating light to the target object, utilizing properties in which near areas look bright and far areas look dark in the image, and measuring the depth of each position in the image.

As a third method, there is a method which does not rely on the three-dimensional shape measuring method. In the third method, plural markers are attached to a target object and the locations of the markers are measured.

With the above-described first-third methods, a position of an object can be obtained by, for example, measuring the shapes or the like of a target object, detecting locations of joints based on measured data of the shapes, and calculating the angles of the joints.

The above-described first-third methods have the following problems.

The first method has problems such as requiring a specialized apparatus such as a laser irradiation mechanism, taking up large space, requiring large cost, and requiring time for scanning. Thus, the method is applicable to only limited special purposes.

The second method has problems such as presuming that the materials or patterns on the surface of a target object do not change regardless of whether the target object is a solid and therefore being unable to perform accurate measurement where there is individual difference and/or a change of physical property of the surface of the target object.

The third method has problems such as requiring a laborious task of attaching markers onto a target object and being unable to handle a case where markers cannot be attached in the first place.

Further, Japanese Laid-Open Patent Publication No. 2004-328657 discloses a method of capturing a first image of a target object by irradiating strobe light to the target object, capturing a second image of the target object without irradiating light to the target object, and obtaining a difference between the two captured images, to thereby obtain information of depth of the target object. However, since the information of depth is obtained based on brightness, this method has the same problems as the second method of being unable to accurately measure, for example, reflectivity or the shape of the target object.

Further, Japanese Laid-Open Patent Publication No. 2007-174566 discloses a method of detecting eyes that become red due to flash of a camera based on a difference between a single lens image obtained before switching to flash and another single lens image obtained after switching to flash, and extracting a facial area within an image based on the locations of the detected eyes. However, since this method detects the contour of a face by a regular image processing method, the contour of a face cannot be accurately detected due to changes in the condition and/or the background of the target object and the facial area cannot be precisely extracted.

SUMMARY

According to an aspect of the invention, there is provided a position measuring apparatus including a first irradiating part that irradiates a first beam to an object, a second irradiating part that irradiates a second beam to the object, a capturing part that captures images of the object, a processing part that generates a first difference image and a second difference image by processing the images captured by the capturing part, an extracting part that extracts a contour and a feature point of the object from the first difference image, a calculating part that calculates three-dimensional coordinates of a reflection point located on the object based on the second difference image, and a determining part that determines a position of the object by matching the contour, the feature point, and the three-dimensional coordinates with respect to predetermined modeled data of the object.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 3 is a schematic diagram illustrating an example of modeled data stored in a model data storage part according to an embodiment of the present invention;

DESCRIPTION OF EMBODIMENTS

<Configuration>

Figure 1:
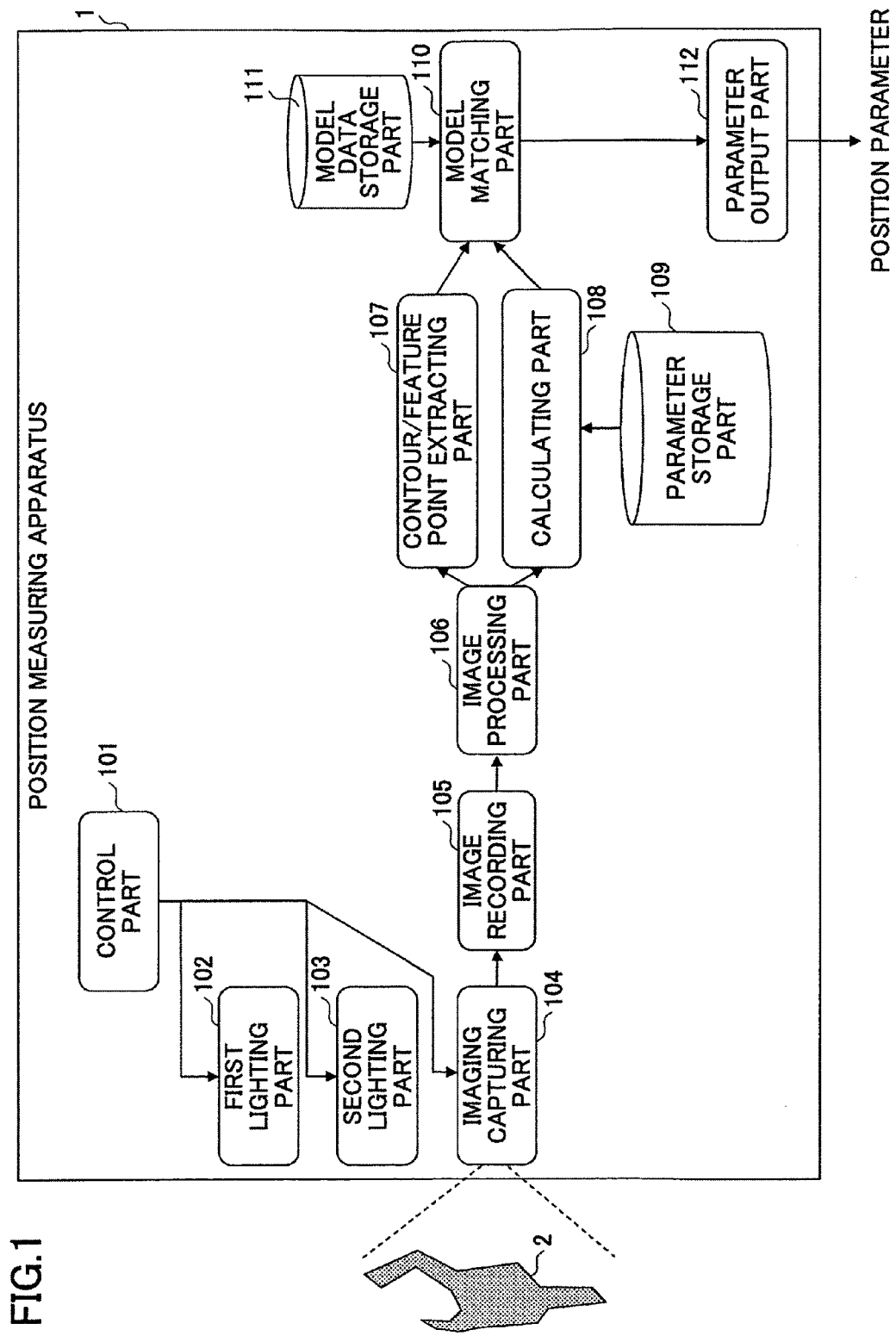
FIG. 1 is a schematic diagram illustrating an exemplary configuration of a position measuring apparatus according to an embodiment of the present invention.

FIG. 1 is a schematic diagram illustrating an exemplary configuration of a position measuring apparatus according to an embodiment of the present invention.

In FIG. 1, the position measuring apparatus 1 includes a control part 101, a first lighting part 102, a second lighting part 103, an image capturing part (e.g., camera) 104, an image recording part 105, an image processing part 106, a contour/feature extracting part 107, a calculating part 108, a parameter storage part 109, a model matching part 110, a model data storage part 111, and a parameter output part 112.

The control part 101 controls the turning on/off of the lighting of the first lighting part 102 and the second lighting part 103.

The first lighting part 102 irradiates beams (hereinafter also referred to as "plane radiation beams") to a multiple joint object (measurement target) 2. The beams irradiated from the first lighting part 102 evenly cover an entire surface of the multiple joint object 2.

The second lighting part 103 irradiates local discrete beams (hereinafter also referred to as "pattern beams") to the multiple joint object 2. The beams irradiated from the second lighting part 102 form a two-dimensional pattern on the surface of the multiple joint object 2 (e.g., a grid pattern, spot pattern). The two-dimensional pattern formed on the multiple joint object 2 enables reflection points on the surface of the multiple joint object 2 (points on the surface of the multiple joint object 2 that reflect irradiated beams) to be identified.

The image capturing part 104 captures an image of the multiple joint object 2 and outputs data of the captured image. The images captured by the image capturing part 104 can be categorized basically into three types. A first type includes images captured where beams are irradiated from the first lighting part 102. A second type includes images captured where beams are irradiated from the second lighting part 103. A third type includes images captured where no beams are irradiated from both the first and second lighting parts 102, 103. Alternatively, the images captured by the image capturing part 104 can be categorized into two types. The first type includes images captured where beams are simultaneously irradiated from both the first and second lighting parts 102 in which the intensities of the beams irradiated from the first lighting part 102 and the second lighting part 103 are adjusted. The second type includes images captured where no beams are irradiated from both the first and second lighting parts 102, 103.

Figure 2A:
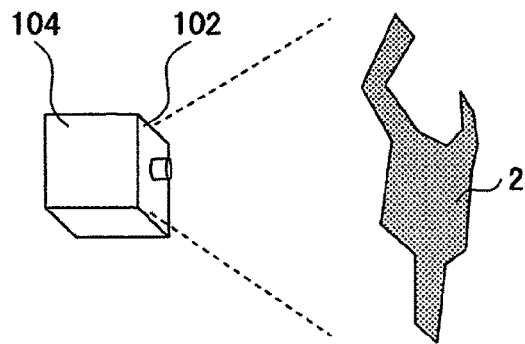
FIGS. 2A-2C are schematic diagrams for describing exemplary configurations of a first lighting part, a second lighting part, and a image capturing part according to an embodiment of the present invention.
Figure 2B:
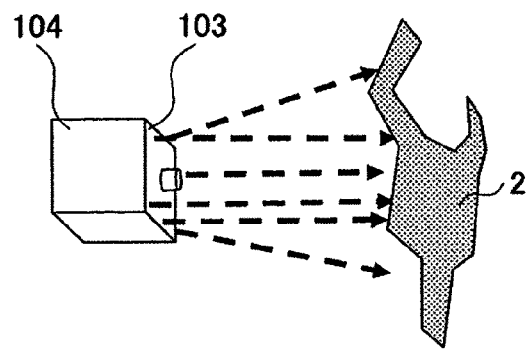
Figure 2C:
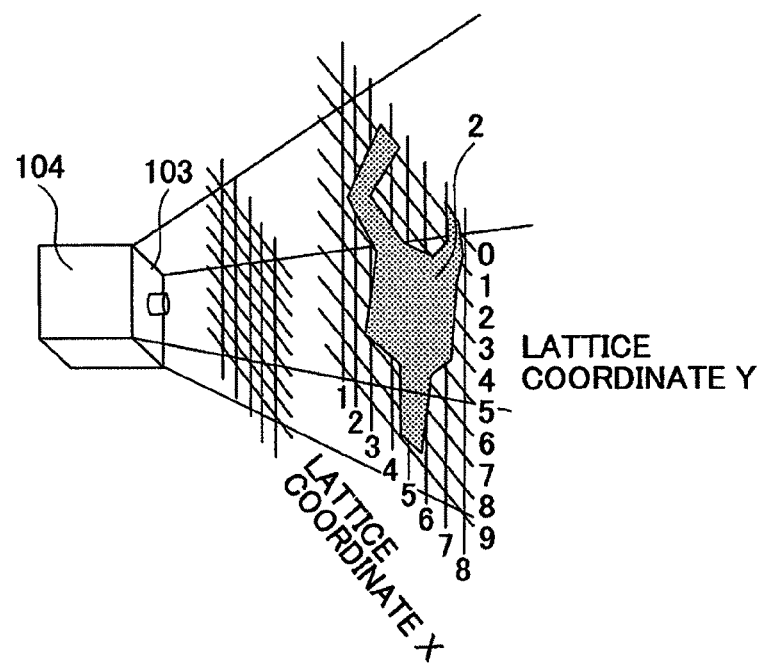

FIGS. 2A-2C are schematic diagrams for describing exemplary configurations of the first lighting part 102, the second lighting part 103, and the image capturing part 104. FIG. 2A illustrates a state where plane radiation beams are irradiated to the multiple joint object 2 from the first lighting part 102 positioned on a front surface of the image capturing part 104 (the side towards the image capturing direction). FIG. 2B illustrates a state where pattern beams (in this example, spot pattern beams) are irradiated to the multiple joint object 2 from the second lighting part 103 positioned on a front surface of the image capturing part 104. The pattern elements (in this example, spots) of the pattern (in this example, spot pattern) formed by the pattern beams may be arranged in an annular formation. Thereby, the points on the surface of the multiple joint object 2 that reflect the irradiated pattern beams enable the location (irradiation source) of a spot corresponding to each spot pattern beam to be identified by analyzing captured images (below-described difference pictures). FIG. 2C illustrates a state where pattern beams (grid pattern beams) are irradiated from the second lighting part 103 positioned on the front surface of the image capturing part 104 to form a grid-like pattern on the multiple joint object 2. In the same way as in the example of FIG. 2B, the points on the surface of the multiple joint object 2 that reflect the irradiated pattern beams enable the location (X,Y coordinates) of a grid corresponding to each grid pattern beam to be identified by analyzing captured images (difference patterns). In a case where a part(s) of the multiple joint object 2 is bent or tilted, the grid pattern formed by the grid pattern beams may become distorted in correspondence with the bending or tilting. However, because the relationship of the location of adjacent grids (grid points) does not change even where the multiple joint object 2 are bent or tilted, the location of a grid corresponding to each grid pattern beam can be identified. Although not illustrated in the drawings, moiré pattern beams may be used as the pattern beams. The moiré pattern beams are similar to the grid pattern beam but are different in that various moiré patterns are formed depending on the shape and space (arrangement) of the grid pattern projected on the multiple joint object 2 where, for example, beams are transmitted through a grating.

Methods for identifying a pattern element formed by pattern beams can be categorized into a topology identification method and a local identification method. The topology identification method enables each pattern element to be identified by referring to the arrangement (adjacent relationship) of pattern elements formed by pattern beams. It can be said that pattern beams that allow the topological identification have a topological connective property. Because three-dimensional coordinates of an irradiation source of each pattern beam, two-dimensional coordinates of the irradiation source, a three-dimensional direction of each irradiated pattern beam, and a two-dimensional direction of each irradiated pattern beam can be obtained beforehand and because two-dimensional coordinates of the irradiation source have a characteristic of being more inward (i.e. closer to an optical axis of the image capturing part 104) as a beam corresponding to a reflection point becomes smaller, reflection points of the multiple joint object 2 corresponding to pattern elements of irradiation sources can be identified by tracing irradiation sources located on the two-dimensional image in the beam irradiation direction starting from an irradiation source located on an inward side (i.e. close to the optical axis of the image capturing part 104). The topology identification method can be used, for example, where the multiple joint object 2 has joints exhibiting little movement and has a protruding configuration. In a case where the multiple joint object 2 exhibits complicated movement and/or has a deficient configuration that adversely affects the topology of the pattern beam, it is suitable to use the local identification method.

The local identification method identifies each pattern element by focusing on a unique aspect (e.g., shape, size, position) of each pattern element. It can be said that pattern beams that allow the local identification have a local distinctive property.

In a case where the pattern beams of FIG. 2B are spot pattern beams, there is no need to differentiate the pattern beams (e.g., by changing the shapes of the pattern beams) if the topology identification method can be used. In a case where the local identification method is to be used, the shape of a pattern element (spot) may be changed (e.g., adding a protrusion or a recess to a part of the pattern element) depending on the location on which a corresponding pattern beam is irradiated. Alternatively, the size of the pattern element may be changed while maintaining its shape depending on the location on which a corresponding pattern beam is irradiated.

In a case where the pattern beams of FIG. 2C are grid pattern beams, there is no need to differentiate the pattern beams if the topology identification method can be used. In a case where the local identification method is to be used, the shape of a pattern element (grid) may be changed (e.g., adding a protrusion or a recess to a part of the pattern element) depending on the location on which a corresponding pattern beam is irradiated. Alternatively, the space between pattern elements (grids) may be changed while maintaining their shape depending on the location on which a corresponding pattern beam is irradiated.

In a case where the pattern beams are moiré pattern beams, both the topology identification method and the local identification method can be used because a moiré pattern element itself is unique.

Returning to FIG. 1, the image recording part 105 stores data of the three types of images captured by the image capturing part 104. Alternatively, the image recording part 105 may store data of the two types of images captured by the image capturing part 104.

The image processing part 106 generates first and second difference image data from the data of the two or three types of images stored in the image recording part 105. The first difference image data indicates the difference between data of an image captured when plane radiation beams are irradiated from the first lighting part 102 to the multiple joint object 2 and data of an image captured when no plane radiation beams are irradiated from the first lighting part 102 to the multiple joint object 2. The second difference image data indicates the difference between data of an image captured when pattern beams are irradiated from the second lighting part 103 to the multiple joint object 2 and data of an image captured when no pattern beams are irradiated from the second lighting part 103. Further, the image processing part 106 may also generates third difference data indicating the difference between data of an image captured when plane radiation beams are irradiated from the first lighting part 102 to the multiple joint object 2 and data of an image captured when pattern beams are irradiated from the second lighting part 103 to the multiple joint object 2 by referring to the difference of intensities of the plane radiation beams and the pattern beams.

The contour/feature extracting part 107 extracts the contour of the multiple joint object 2 and feature points of bending parts of the joints of the multiple joint object 2 based on the first difference image data obtained from the image processing part 106. The contour and feature points extracted by the contour/feature extracting part 107 may be output as a contour/feature coordinate data list in a subsequent step.

The calculating part 108 calculates the three-dimensional coordinates of each of the reflection points reflecting the pattern beams based on the second difference data obtained from the image processing part 106. The three-dimensional coordinates of each of the reflection points calculated by the calculating part 108 may be output as a pattern reflection point coordinate list in a subsequent step.

The parameter storage part 109 stores parameters that are required for the calculation performed by the calculating part 108. The parameters include, for example: a focal point f of a lens of the image capturing part 104; a distance ratio (ratio between distance on a three-dimensional image and distance between a two-dimensional image (e.g., number of pixels) $C_{px}$, $C_{py}$; an irradiation source coordinate ($L_{xi}$, $L_{yi}$, $L_{zi}$) of each light source (identifier $_i$); and an irradiation direction vector ($L_{xdi}$, $L_{ydi}$, $L_{zdi}$) of each light source (identifier $_i$) These parameters are estimated and stored beforehand.

The model matching part 110 determines the position parameters of the multiple joint object 2 by performing a model matching process by using the contour/feature coordinate data list (list indicating the contours and feature points extracted by the contour/feature extracting part 107), the pattern reflection point coordinate list (list indicating the three-dimensional coordinates of reflection points calculated by the calculating part 108), and modeled data of the multiple joint object 2 stored in the below-described model data storage part 111.

The model data storage part 111 stores data indicating, for example, the coordinates of feature points of each part (block) of the multiple joint object 2, the tilt of the entire multiple joint object 2, and the angle of each joint of the multiple joint object 2. FIG. 3 is a schematic diagram illustrating an example of the modeled data stored in the modeled data storage part 111. In this example, the modeled data includes a coordinate list indicative of the coordinates of feature points of the parts of the multiple joint object 2, the tilt of the multiple joint object 2, and angles of the joints of the multiple joint object 2. Various known modeling methods may be used for expressing the shape of an object by using a discrete sequence of numbers. For example, a method of expressing a shape of an object by combining plural closed planes or by performing bi-cubic spline interpolation may be used, so that a curved shaped can be efficiently expressed by using a comparatively small number of representative dots. By using these methods, the below-described model matching process can be performed at high speed.

Returning to FIG. 1, the parameter output part 112 outputs the position parameters determined by the model matching part 110.

According to an embodiment of the present invention, there is a premise that the multiple joint object 2 has a property of exhibiting diffuse reflection of the plane radiation beams of the first lighting part 102 and the pattern beams of the second light part 103. That is, this embodiment is neither applied to a case where the multiple joint object 2 is formed of a material that absorbs light nor a case where the multiple joint object 2 is formed of a material that exhibits specular reflection and reflects light that cannot be obtained by the image capturing part 104. It is to be noted that this embodiment can be applied to a surface of a human body because the surface of the human body has a diffuse reflection property. Further, it is also a premise that the multiple joint object 2 is positioned close to the image capturing part 104, that no object is interposed between the multiple joint object 2 and the image capturing part 104, and that no object is in a position (e.g., a position immediately behind the image capturing part 104) preventing the extracting of contours and/or reflection points of difference images. That is, it is a premise that the difference image between plane radiation and no plane radiation represents a silhouette of the multiple joint object 2 and that the difference image between pattern beam irradiation and no pattern beam irradiation represents a pattern reflected from the multiple joint object 2.

[Operation]

Figure 4:
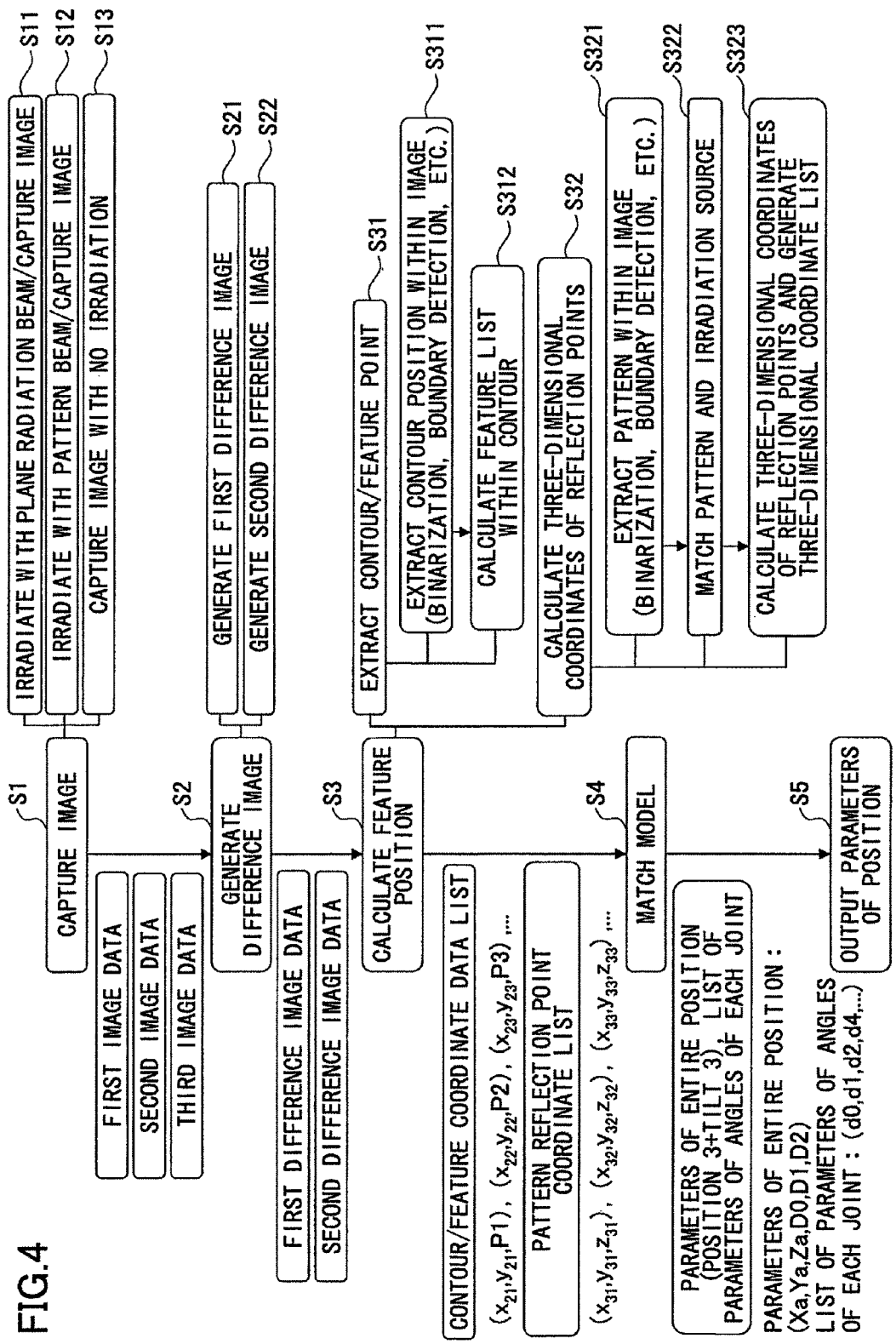
FIG. 4 is a flowchart illustrating an overall operation of a position measuring apparatus according to an embodiment of the present invention.

FIG. 4 is a flowchart illustrating an overall operation of the position measuring apparatus 1 according to an embodiment of the present invention.

In Step S1 of FIG. 4, the control part 101 controls the turning on/off of the lighting of the first lighting part 102 and the second lighting part 103, and the image capturing part 104 captures images of the multiple joint object 2 and outputs data of the captured images. More specifically, for example, the image capturing part 104 captures an image of the multiple joint object 2 where plane radiation is performed by only turning on the first lighting part 102 (Step S1), the image capturing part 104 captures an image of the multiple joint object 2 where pattern beam irradiation is performed by turning on the second lighting part 103 (Step S12), the image capturing part 104 captures an image of the multiple joint object 2 where no such lighting is performed (however, natural light may be present) by turning off both the first and second lighting part 102, 103 (Step S13). It is to be noted that the order of capturing the images may be changed. Then, data of the images captured in Steps S11-S13 (first-third image data) are temporarily recorded by the image recording part 105.

Figure 5A:
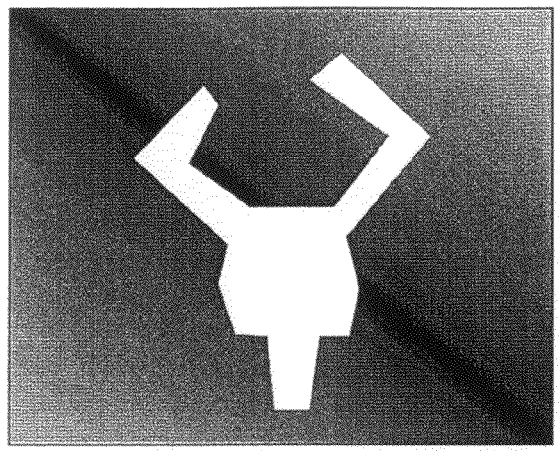
FIGS. 5A-5C illustrate examples of images captured in Steps S11-S13 according to an embodiment of the present invention.
Figure 5B:
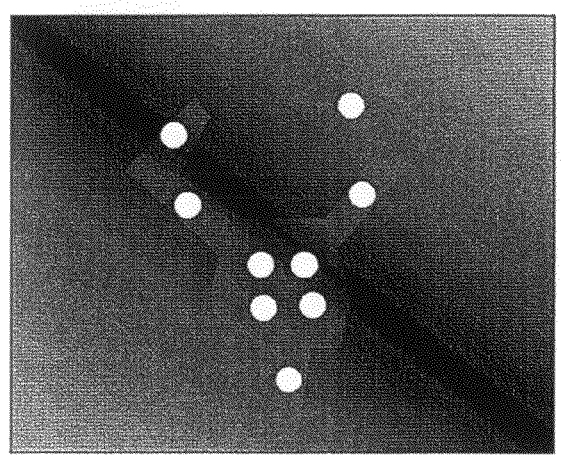
Figure 5C:
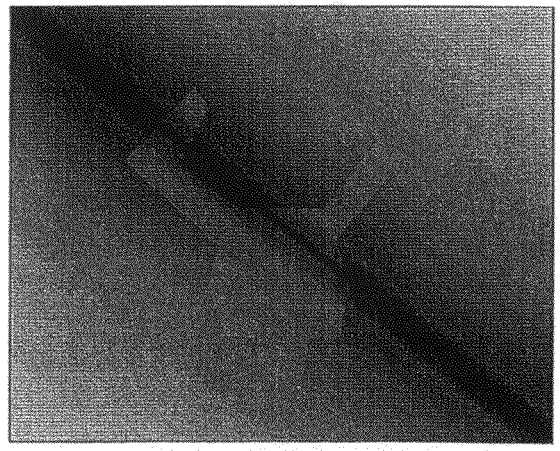

FIGS. 5A-5C illustrate examples of images captured in Steps S11-S13. FIG. 5A illustrates an image captured in performing the plane radiation. FIG. 5B illustrates an image captured in performing the pattern beam irradiation. FIG. 5C illustrates an image captured where no lighting is performed. In FIG. 5A, although a bright image of the multiple joint object 2 is captured owing to the plane radiation, the image contains noise due to disturbance. It is to be noted that, since the captured image of FIG. 5A is not binarized at this stage, shades and joint seams or the like appear on the surface of the multiple joint object 2. However, such shades and seams or the like are omitted from FIG. 5A. In FIG. 5B, although a bright image of reflection points on the multiple joint object 2 are captured owing to the pattern beam irradiation, the image contains noise due to disturbance. It is to be noted that, since the captured image of FIG. 5B is not binarized at this stage, shades and seams of joints or the like appear on the surface of the reflection points of the multiple joint object 2. However, such shades and joint seams or the like are omitted from FIG. 5B. In FIG. 5C, an image including the multiple joint object 2 and other areas is captured where no lighting is performed.

Then, returning to the flowchart of FIG. 4, the image processing part 106 generates a difference image from the image data recorded to the image recording part 105 (Step S2). More specifically, for example, the image processing part 106 generates a first difference image based on the first difference image data indicating the difference between data of an image captured when plane radiation beams are irradiated from the first lighting part 102 to the multiple joint object 2 and data of an image captured when no plane radiation beams are irradiated from the first lighting part 102 to the multiple joint object 2 (Step S21), and generates a second difference image based on the second difference image data indicating the difference between data of an image captured when pattern beams are irradiated from the second lighting part 103 to the multiple joint object 2 and data of an image captured when no pattern beams are irradiated from the second lighting part 103 (Step S22).

Figure 6A:
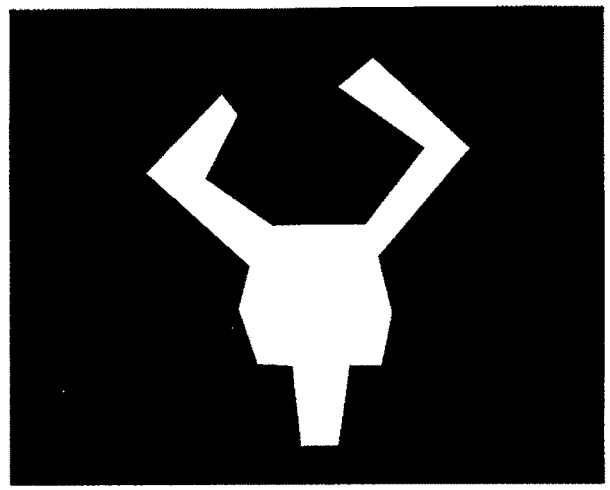
FIGS. 6A-6B illustrate examples of images generated in Steps S11-S13 according to an embodiment of the present invention.
Figure 6B:
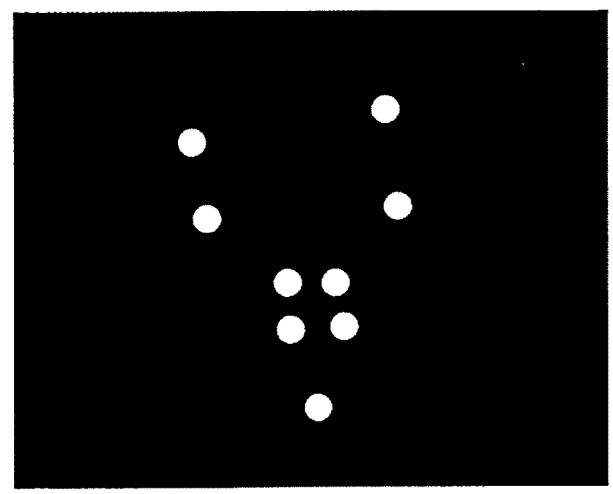

FIGS. 6A-6B illustrate examples of images generated in Steps S11-S13. FIG. 6A illustrates an image generated from the first difference image data. FIG. 6B illustrates an image generated from the second difference image data. By obtaining the difference between the image of FIG. 5A and the image of FIG. 5C, the noise due to disturbance can be eliminated and only reflection components reflecting the plane radiation can be obtained. It is to be noted that, since the captured image of FIG. 6A is not binarized at this stage, shades and seams of joint or the like appear on the surface of the reflection points of the multiple joint object 2 due to concaves/convexes on the surface of the multiple joint object 2. However, such shades and joint seams or the like are omitted from FIG. 6A. FIG. 6B illustrates an image generated from the second difference image data. By obtaining the difference between the image of FIG. 5B and the image of FIG. 5C, the noise due to disturbance can be eliminated and only reflection components reflecting the pattern beam irradiation can be obtained. It is to be noted that, since the captured image of FIG. 6B is not binarized at this stage, shades and joint seams of joint or the like appear on the surface of the reflection points of the multiple joint object 2 due to concaves/convexes on the surface of the multiple joint object 2. However, such shades and seams or the like are omitted from FIG. 6B.

Then, returning to the flowchart of FIG. 4, the contour/feature extracting part 107 and the calculating part 108 are used to calculate the locations of features of the multiple joint object 2 based on the first and second difference data obtained from the image processing part 106 (Step S3). More specifically, for example, the contour/feature extracting part 107 extracts the contour of the multiple joint object 2 and feature points of bending parts of the joints of the multiple joint object 2 based on the first difference image data obtained from the image processing part 106 (Step S31), and the calculating part 108 performs image processing based on the second difference data obtained from the image processing part 106 and calculates the three-dimensional coordinates of each of the reflection points reflecting the pattern beams based on the results of the image processing (Step S32).

Figure 7A:
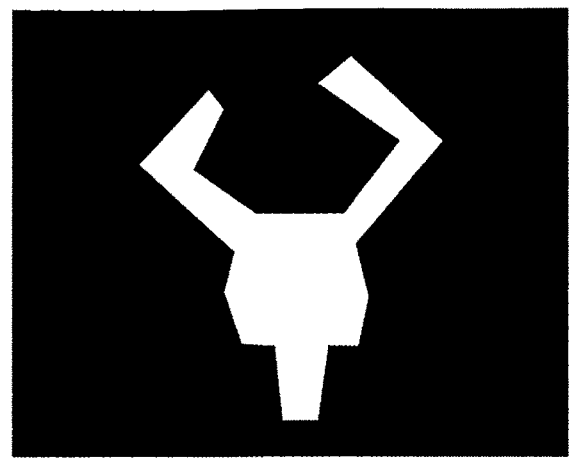
FIGS. 7A-7C are schematic diagrams for describing a process of extracting contour and feature points of a multiple joint object according to an embodiment of the present invention.
Figure 7B:
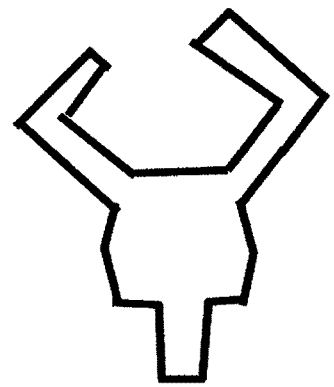
Figure 7C:
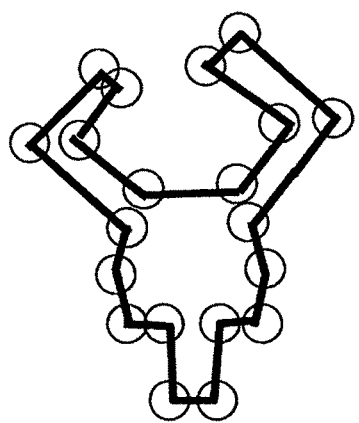

Next, processes performed by the contour/feature extracting part 107 are described in detail. The contour/feature extracting part 107 extracts a contour location by performing, for example, binarization, for boundary detection on the first difference image (Step S311). By the binarization, the surface of the multiple joint object 2 and the background of the multiple joint object 2 can be separated. Then, by tracing the pixels situated along the boundary between the surface of the multiple joint object 2 and the background of the multiple joint object 2, the contour of the multiple joint object 2 can be obtained. Then, the contour/feature extracting part 107 extracts feature points at bending parts of the joints of the multiple joint object 2 according to the extracted contour location and generates a contour/feature point data list (Step S312). The contour/feature point data list may be expressed with a format such as (x21, y21, P1), (x22, y22, P2) . . . in which "x21, x22, . . . " represent x coordinates of feature points on a two-dimensional image, "y21, y22, . . . " represent y coordinates of feature points on a two-dimensional image, and "P1, P2, . . . " represent identifiers of feature points. FIGS. 7A-7C are schematic diagrams for describing an extracting contour and feature points of the multiple joint object 2. As shown in FIG. 7B, the contour of the multiple joint object 2 is extracted from the first difference image of FIG. 7A. Then, as illustrated in FIG. 7C, feature points (illustrated with circles) of the multiple joint object 2 are extracted from the extracted contour of FIG. 7B. The areas in which the feature points face correspond to the joints of the multiple joint object 2. By connecting the feature points, the multiple joint object 2 can be divided into plural parts.

Next, processes performed by the calculating part 108 are described in detail. First, the calculating part 108 extracts each of the pattern elements corresponding to reflection points by performing, for example, binarization, for boundary detection on the second difference image (Step S321). Then, by searching the second difference image, the calculating part 108 matches the extracted patterns elements with corresponding light irradiation sources IDs (Step S322). Then, the calculating part 108 calculates the three-dimensional coordinates of reflection positions corresponding to each pattern element based on parameters of the parameter storage part 109 and generates a three-dimensional coordinate list (Step S323). The three-dimensional coordinate list may be expressed with a format such as (x31, y31, z31), (x32, y32, z32), . . . in which "x31, x32, . . . " represent x coordinates of reflection points on a three-dimensional image, "y31, y32, . . . " represent y coordinates of reflection points on a three-dimensional image, and "z31, z32, . . . " represent z coordinates of reflection points on a three-dimensional image.

The matching between the reflection points and the irradiation sources IDs (Step S322) is performed differently depending on whether the above-described topology identification method is used or the local identification method is used. In a case where the local identification method is used, the reflection points can be directly matched with irradiation sources IDs based on, for example, the shape or the size of the pattern element formed on the reflection points. Next, a case of using the topology identification method is described.

Figure 8A:
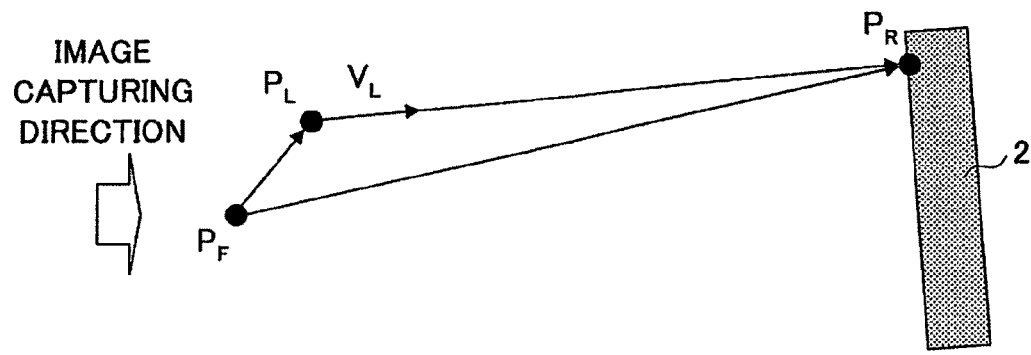
FIGS. 8A and 8B are schematic diagrams for describing a three-dimensional and a two-dimensional relationship between a focal point, a beam irradiation source, and a reflection point according to an embodiment of the present invention.
Figure 8B:
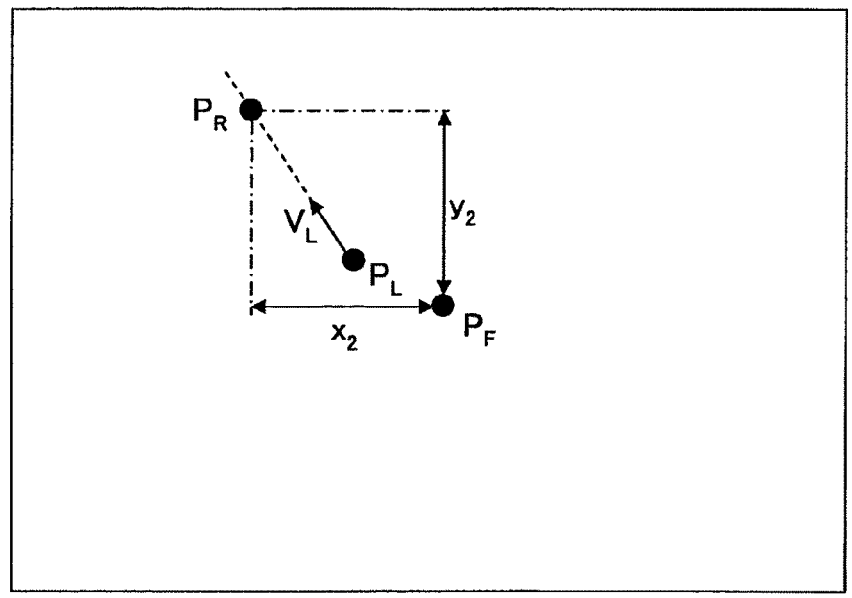

FIGS. 8A and 8B are schematic diagrams for describing a three-dimensional and a two-dimensional relationship between a focal point $P_F$ a beam irradiation source $P_L$, and a reflection point $P_R$. FIG. 8A illustrates the multiple joint object 2 seen from the side with respect to the image capturing direction. In this example, the focal point $P_F$ is a reference point, and the beam irradiation source $P_L$ is located at a position slightly deviated from the focal point $P_F$. Accordingly, in a case where a single pattern beam is irradiated from the beam irradiation source $P_L$ in a direction of a beam irradiation vector $V_L$, the area on the surface of the multiple joint object 2 in which the pattern beam is incident corresponds to the reflection point $P_R$. FIG. 8B illustrates the state of FIG. 8A projected on a two-dimensional image toward the image capturing side. In FIG. 8B, the reflection point $P_R$ is located at a point extending from the beam irradiating source $P_L$. In FIG. 8B, the two-dimensional coordinates of the reflection point $P_R$ based on the focal point $P_F$ is indicated as x2, y2.

Since the two-dimensional coordinates of the irradiation source $P_L$ on the two-dimensional image and the direction of the beam irradiation vector $V_L$ (two-dimensional coordinate component) corresponding to the pattern of each pattern beam are known beforehand, it can be determined which reflection point $P_R$ corresponds to which pattern element (of which pattern beam) by determining whether the beam irradiation source $P_L$ of each pattern beam reaches a corresponding reflection point $P_R$ by tracing the direction of the beam irradiation vector $V_L$ of the irradiated pattern beam.

Figure 9A:
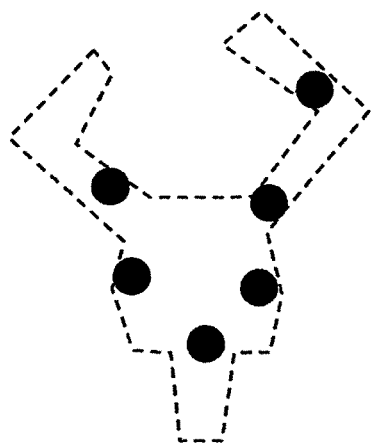
FIGS. 9A-9B are schematic diagrams for describing a process of identifying a beam irradiation source in a case where a pattern element formed by a pattern beam is a spot pattern according to an embodiment of the present invention.
Figure 9B:
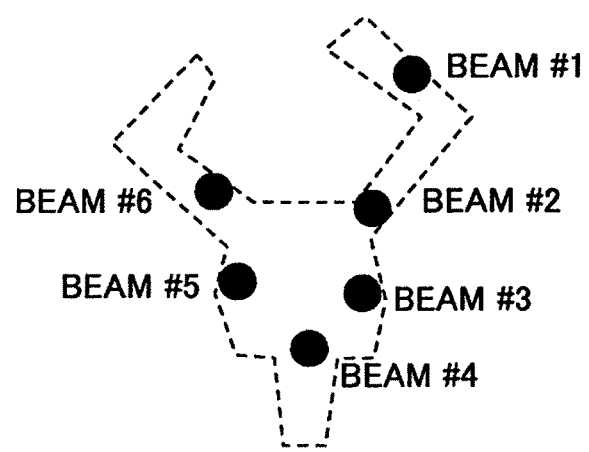
Figure 10A:
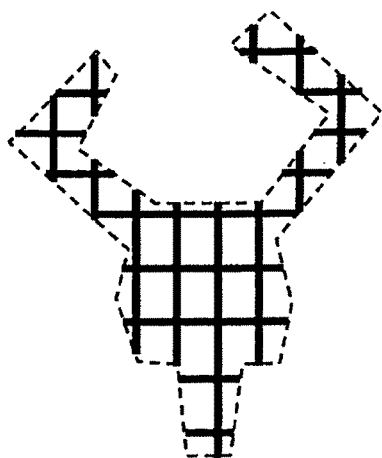
FIGS. 10A-10B are schematic diagrams for describing a process of identifying a beam irradiation source in a case where a pattern element of a pattern beam is a grid pattern according to an embodiment of the present invention.
Figure 10B:
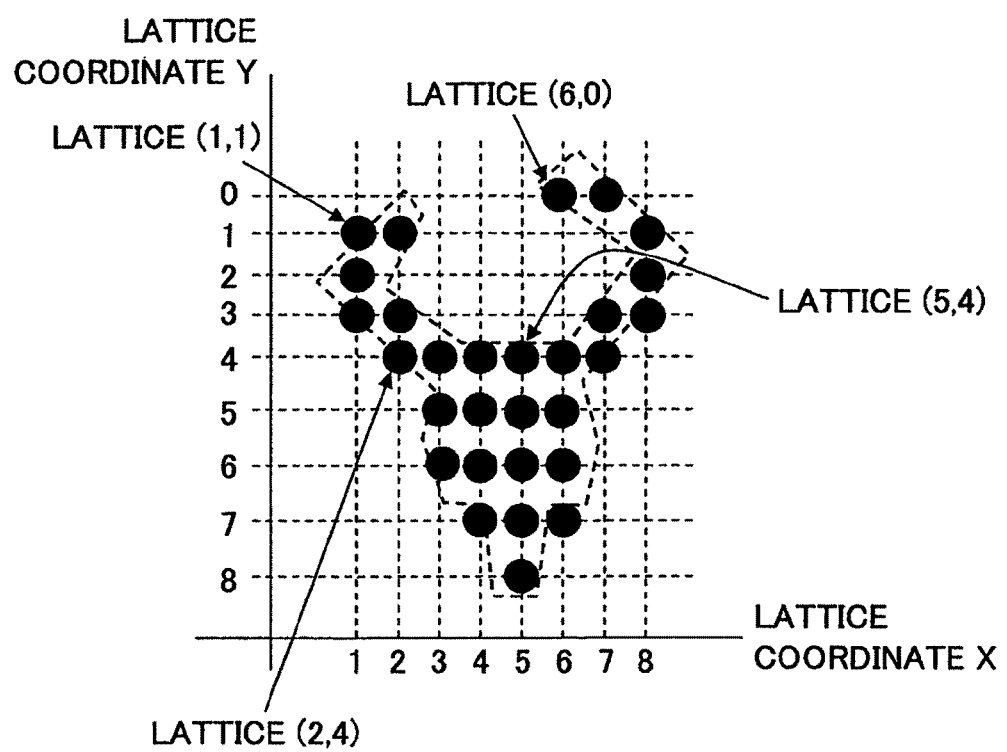

FIGS. 9A-9B are schematic diagrams for describing a process of identifying a beam irradiation source in a case where a pattern element of a pattern beam is a spot pattern. In this example, a pattern beam corresponding to each irradiation source can be identified as illustrated in FIG. 9B by referring to the second difference image illustrated in FIG. 9A. FIGS. 10A-10B are schematic diagrams for describing a process of identifying a beam irradiation source in a case where a pattern element of a pattern beam is a grid pattern. In this example, a pattern beam corresponding to each irradiation source can be identified as illustrated in FIG. 10B by referring to the second difference image illustrated in FIG. 10A.

Returning to FIG. 4, calculation of the three-dimensional coordinates of each reflection point (Step S323) is described as follows. According to the three-dimensional relationship illustrated in FIG. 8A, a relationship expressed in the following Formula 1 can be obtained in a case where the beam irradiation source ID is indicated as "$i$", the three-dimensional coordinates of the beam irradiation source $P_L$ are indicated as $(L_{xi}, L_{yi}, L_{zi})$ the three-dimensional coordinates of the beam irradiation vector $V_L$ are indicated as $(L_{xdi}, L_{ydi}, L_{zdi})$, the three-dimensional coordinates of the reflection point $P_R$ are indicated as $(x_{3i}, y_{3i}, z_{3i})$ and a variable 1 is indicated as the distance (scalar value) from the beam irradiation source $P_L$ to the reflection point $P_R$.

$$\begin{pmatrix} x_{3i} \\ y_{3i} \\ z_{3i} \end{pmatrix} = l * \begin{pmatrix} L_{dxi} \\ L_{dyi} \\ L_{dzi} \end{pmatrix} + \begin{pmatrix} L_{xi} \\ L_{yi} \\ L_{zi} \end{pmatrix} \qquad \text{[Formula 1]}$$

Further, the following relationships expressed in the following Formulas 2 and 3 can be obtained in a case where the two-dimensional coordinates of the reflection point PR on a two-dimensional image are indicated as $(x_{2i}, y_{2i})$, a focal distance of the lens of the image capturing part 104 is indicated as "f", the ratio between the distance on a three-dimensional image and the distance on a two-dimensional image with respect to the x coordinate direction is indicated as "$C_{px}$", and the ratio between the distance on a three-dimensional image and the distance on a two-dimensional image with respect to the y coordinate direction is indicated as "$C_{py}$".

$$x_{2i} * C_{px} = \frac{x_{3i} * f}{z_{3i}} \qquad \text{[Formula 2]}$$

$$y_{2i} * C_{py} = \frac{y_{3i} * f}{z_{3i}} \qquad \text{[Formula 3]}$$

In the above-described Formulas 1-3, since the number of unknown values is four, i.e. "$x_{3i}$", "$y_{3i}$", "$z_{3i}$", and "1", and the number of formulas (Formula (1) can be broken down into three formulas) is five, the formulas can be solved. Thereby, the three-dimensional coordinates $(x_{3i}, y_{3i}, z_{3i})$ of the reflection point $P_R$ can be obtained.

Next, returning to FIG. 4, the model matching part 110 generates parameters of the position of the entire multiple joint object 2 (entire position parameters) and a list indicating the parameters of the angles of the joints of the multiple joint object 2 (joint angle list) (Step S4). The model matching part 110 generates the entire position parameters and the joint angle list by performing model matching, that is, matching modeled data of the multiple joint object 2 stored in the model data storage part 111 with data of the contour and features in the contour/feature coordinate data list obtained from the contour/feature extracting part 107 and data of the three-dimensional coordinates of each of the reflection points in the pattern reflection point coordinate list obtained from the calculating part 108. The entire position parameters may be expressed with a format such as (Xa, Ya, Za, D0, D1, D2) in which "Xa, Ya, Za" indicate three-dimensional position of the multiple joint object 2 and "D0, D1, D2" indicate the tilt of the multiple joint object 2. The joint angle list may be expressed with a format such as (d0, d1, d2, d4, . . . ) in which "d0, d1, d2, d4, . . . " indicate the angle of each joint of the multiple joint object 2.

Figure 11:
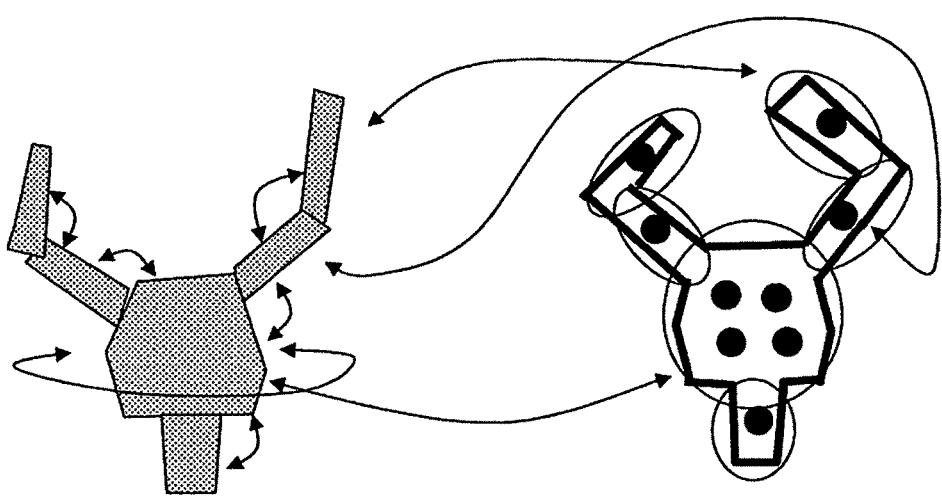
FIG. 11 is a schematic diagram for describing an example of a model matching operation according to an embodiment of the present invention.

FIG. 11 is a schematic diagram for describing an example of a model matching operation according to an embodiment of the present invention. In this embodiment, position parameters of modeled data are determined by having model data (mathematical model) applied with constraints regarding the positions of the contour and the feature points with respect to a two-dimensional image and constraints regarding three-dimensional coordinates of the reflection points located on each part of the multiple joint object 2. In other words, each part of the multiple joint object 2 is applied with matching position/shape parameters obtained from parameters of the modeled data regarding parallel movement (translation), rotation, and joint angles. For example, the parameters may be stored in the model data storage part 111 in units in which each unit includes a combination of data indicative of a region distinguished by feature points, contour coordinate values of each region, and three-dimensional coordinates of a corresponding pattern element. Typically, in a case where each part of a multiple joint object is assumed to be a rigid member, parameters of parallel movement (translation), position, and tilt of the parts of a multiple joint object can be calculated based on three-dimensional positions of a few points located on the multiple joint object and the contour formed on a two-dimensional image. However, in this embodiment, since rigid parts of the multiple joint object 2 are connected by joints, the parameters of each part are desired to conform with each other in calculating the parameters of parallel displacement (translation), position, and tilt of the parts of the multiple joint object 2. In calculating the parameters of the plural parts of the multiple joint object 2 according to the above-described constraints regarding the positions of the contour and the feature points with respect to a two-dimensional image and constraints regarding the three-dimensional positions of the reflection points of the parts of the multiple joint object 2, a common dynamic parameter matching method (e.g., methods used for controlling position of robots) may be used.

There are various methods for obtaining parameters of three-dimensional parallel displacement (position parameter) by matching modeled data with respect to data of a list indicating coordinates of contour/feature point candidates of blocks (rigid parts) of a multiple joint object 2. One example of the methods is described below.

(i) Position parameters used for matching modeled data of corresponding blocks with respect to, for example, positions of feature points located on a contour/feature image of a center block (block located at a center of the multiple joint object 2) are calculated.

(ii) The position parameters of blocks connected to the center block provide a degree of freedom corresponding to the parameters of the angles of the joints based on the position parameters of the center block. The joint angle parameters are calculated based on the position parameters of the center block obtained in the process (i), modeled data, and data indicating contour/feature point candidates of each block by using known parameter conversion methods. Accordingly, the position parameters of each block are obtained.

(iii) In a case where uncalculated blocks are connected to blocks whose position parameters are already calculated, the position parameters of the uncalculated blocks are obtained based on the calculated blocks (in this example, center block of (ii)).

(iv) This method is completed when the position parameters of all blocks are calculated.

The method for obtaining the position parameters is not limited to the methods including the processes of (i) through (iii). For example, one method may obtain position parameters from a block located at an end of the multiple joint object 2 instead of from the center of the multiple joint object 2. Another method may correct parameters of a block of the multiple joint object 2, so that parameters can be obtained efficiently. Basically, parameters can be precisely obtained in high speed by gradually obtaining parameters so that conformity of the parameters of connecting blocks can be attained.

Next, returning to FIG. 4, the parameter output part 112 outputs the entire position parameters and the joint angle list generated by the model matching part 110 (Step S5). Accordingly, the operation of the position measuring apparatus 1 according to an embodiment of the present invention is completed.

<Overview>

With the above-described embodiments of the present invention, the following advantages can be attained.

(1) The position of a multiple joint object can be calculated by obtaining three-dimensional coordinates of a contour and a few pattern reflection points from a difference image. Therefore, the position of the multiple joint object can be calculated with minimal amount of data at high speed.

(2) The position of the contour and the pattern reflection points of the multiple joint object can be calculated based on whether an irradiated beam is reflected from an irradiated part of the multiple joint object. Therefore, the position of the contour and the pattern reflection points of the multiple joint object can be calculated with high precision regardless of parts of multiple joint objects having various reflecting properties. Therefore, the embodiment of the present invention can be applied to parts of multiple joint objects having various optical properties.

(3) The embodiment of the present invention can be realized at low cost since no special equipment such as a laser scanning mechanism is required.

(4) Hence, various positions of a multiple joint object can be calculated at low cost, high speed, and high precision.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A position measuring apparatus comprising:
a first irradiation part that irradiates a first beam to multiple joint object including multiple blocks and multiple joints connecting the multiple blocks;
a second irradiation part that irradiates a second beam to the multiple joint object;
a capture part that captures images of the multiple joint object;
a process part that generates a first difference image and a second difference image by processing the images captured by the capture part, the first difference image being generated according to a difference between an image captured when the first beam is irradiated and an image captured when no beam is irradiated, the second difference image being generated according to a difference between an image captured when the second beam is irradiated and an image captured when no beam is irradiated;

an extract part that extracts a contour and a feature point of the multiple joint object from the first difference image;

a calculation part that calculates three-dimensional coordinates of a reflection point located on the multiple joint object based on the second difference image; and a determination part that determines position parameters of the multiple joint object by matching the contour, the feature point, and the three-dimensional coordinates with respect to predetermined modeled data of the multiple joint object;

wherein the determination part is configured to determine the position parameters of the multiple joint object by calculating position parameters of a center block of the multiple blocks included in the multiple joint object, calculating position parameters of blocks connected to the center block of the multiple joint object, and when uncalculated blocks are connected to blocks whose position parameters are already calculated, obtaining the position parameters of the uncalculated blocks based on the calculated blocks.

2. The position measuring apparatus as claimed in claim 1, wherein the process part is configured to generate the first and second difference image by using the difference of intensities between the first beam and the second beam where images are captured when the first and second beams are irradiated simultaneously.

3. The position measuring apparatus as claimed in claim 1, wherein the second beam has a topological continuous property;

wherein the calculation part is configured to identify a relationship between the reflection point and a pattern element formed by the second beam according to the topological continuous property of the second beam and calculate the three-dimensional coordinates of the reflection point according to the identified relationship and already-known position data of the pattern formed by the second beam.

4. The position measuring apparatus as claimed in claim 1, wherein the second beam has a local distinguishing property;

wherein the calculation part is configured to identify a relationship between the reflection point and a pattern element formed by the second beam according to the local distinguishing property of the second beam and calculate the three-dimensional coordinates of the reflection point according to the identified relationship and already-known position data of the pattern formed by the second beam.

5. The position measuring apparatus as claimed in claim 1, wherein the second beam includes a plurality of spot lights.

6. The position measuring apparatus as claimed in claim 1, wherein the second beam includes a lattice light.

7. The position measuring apparatus as claimed in claim 1, wherein the second beam includes a moiré light.

8. A position measuring method comprising:

irradiating a first beam to a multiple joint object including multiple blocks and multiple joints connecting the multiple blocks;

irradiating a second beam to the multiple joint object;

capturing images of the multiple joint object;

generating a first difference image and a second difference image by processing the images captured by the capturing, the first difference image being generated according to a difference between an image captured when the first beam is irradiated and an image captured when no beam is irradiated, the second difference image being generated according to a difference between an image captured when the second beam is irradiated and an image captured when no beam is irradiated;

extracting a contour and a feature point of the multiple joint object from the first difference image;

calculating three-dimensional coordinates of a reflection point located on the multiple joint object based on the second difference image; and determining position parameters of the multiple joint object by matching the contour, the feature point, and the three-dimensional coordinates with respect to predetermined modeled data of the multiple joint object;

wherein the determining includes determining the position parameters of the multiple joint object by calculating position parameters of a center block of the multiple blocks included in the multiple joint object, calculating position parameters of blocks connected to the center block of the multiple joint object, and when uncalculated blocks are connected to blocks whose position parameters are already calculated, obtaining the position parameters of the uncalculated blocks based on the calculated blocks.

9. The position measuring method as claimed in claim 8, wherein the processing includes generating the first and second difference images by using the difference of intensities between the first beam and the second beam where images are captured when the first and second beams are irradiated simultaneously.

10. The position measuring method as claimed in claim 8, wherein the second beam has a topological continuous property; wherein the calculating includes identifying a relationship between the reflection point and a pattern element formed by the second beam according to the topological continuous property of the second beam and calculating the three-dimensional coordinates of the reflection point according to the identified relationship and already-known position data of the pattern formed by the second beam.

11. The position measuring method as claimed in claim 8, wherein the second beam has a local distinguishing property; wherein the calculating includes identifying a relationship between the reflection point and a pattern element formed by the second beam according to the local distinguishing property of the second beam and calculating the three-dimensional coordinates of the reflection point according to the identified relationship and already-known position data of the pattern formed by the second beam.

12. The position measuring apparatus as claimed in claim 1, further comprising: a data storage part that stores predetermined modeled data of the multiple joint object including at least three-dimensional coordinates of feature points of each block of the multiple joint object, wherein the predetermined modeled data of the multiple joint object includes three-dimensional coordinates of feature points of each block of the multiple joint object, a tilt of the entire multiple joint object, and an angle of each joint of the multiple joint object.

13. The position measuring method as claimed in claim 8, further comprising: storing predetermined modeled data of the multiple joint object including at least three-dimensional coordinates of feature points of each block of the multiple joint object, wherein the predetermined modeled data of the multiple joint object includes three-dimensional coordinates of feature points of each block of the multiple joint object, a tilt of the entire multiple joint object, and an angle of each joint of the multiple joint object.

* * * * *

UNITED STATES PATENT AND TRADEMARK OFFICE
CERTIFICATE OF CORRECTION

| | | |
|---|---|---|
| PATENT NO. | : 8,472,701 B2 | Page 1 of 1 |
| APPLICATION NO. | : 12/585113 | |
| DATED | : June 25, 2013 | |
| INVENTOR(S) | : Hironori Yokoi et al. | |

It is certified that error appears in the above-identified patent and that said Letters Patent is hereby corrected as shown below:

In the Claims

Column 12, Line 59, In Claim 1, delete "beam to" and insert -- beam to a --, therefor.

Signed and Sealed this
Twenty-fourth Day of September, 2013

Teresa Stanek Rea
*Deputy Director of the United States Patent and Trademark Office*